United States Patent [19]

Haefner et al.

[11] Patent Number: 4,861,960
[45] Date of Patent: Aug. 29, 1989

[54] REAL TIME ADAPTIVE CONTROL FOR RESISTANCE SPOT WELDING PROCESS

[75] Inventors: Kenneth B. Haefner; Bruce M. Bernstein; Bernard J. Carey, all of Schenectady; Kenneth J. Overton, Clifton Park, all of N.Y.

[73] Assignee: General Electric Company, Schenectady, N.Y.

[21] Appl. No.: 299,102

[22] Filed: Jan. 19, 1989

Related U.S. Application Data

[63] Continuation of Ser. No. 185,599, Apr. 25, 1988, abandoned.

[51] Int. Cl.⁴ .............................................. B23K 11/24
[52] U.S. Cl. .................................. 219/110; 219/117.1
[58] Field of Search .................... 219/110, 114, 117.1, 219/109

[56] References Cited

U.S. PATENT DOCUMENTS

| | | | |
|---|---|---|---|
| 4,447,700 | 5/1984 | Cohen | 219/117.1 |
| 4,459,457 | 7/1984 | Jurek | 219/110 |
| 4,596,917 | 6/1986 | Nied et al. | 219/109 |

OTHER PUBLICATIONS

Computer Controlled System, K. J. Astrom and B. Wittenmark, Prentice-Hall, Inc., 1984, pp. 165, 166, 187–189.

Primary Examiner—Clifford C. Shaw
Attorney, Agent, or Firm—Paul R. Webb, II; James C. Davis, Jr.

[57] ABSTRACT

This real time adaptive control and method of controlling a spot welding process compensates for electrode wear, oxidized surfaces, fit up variations and machine variations. Workpiece thermal growth is the measurement discriminant and the welding machine heat command is the control input. The control utilizes a least squares estimator to monitor the process and workpiece displacement, a precompensator to shape a desired displacement trajectory command, and a model reference control with a Smith-predictor to compensate for time delays and a proportional-integral-derivative compensator. The model reference control has a mathematical model of the spot welding process and calculates an estimated displacement using a predicated process gain and bias calculated by the estimator. The estimated displacement is compared to the precompensator displacement trajectory and an error is generated which regulates the heat command through the PID compensator.

20 Claims, 6 Drawing Sheets

REAL TIME ADAPTIVE CONTROL FOR RESISTANCE SPOT WELDING PROCESS

This application is a continuation of application Ser. No. 185,599, filed 4/25/88, now abandoned.

A portion of the disclosure of this patent document contains material which is subject to copyright protection. The copyright owner has no objection to the facimile production by anyone of the patent document or patent disclosure, as it appears in the Patent and Trademark Office files or records, but otherwise reserves all copyright rights whatsoever.

BACKGROUND OF THE INVENTION

This invention relates to an improved method and system for controlling a pot welding process in real time which is capable of dealing with the numerous process parameter variations and non-linearities present in this welding process.

Figure 1:
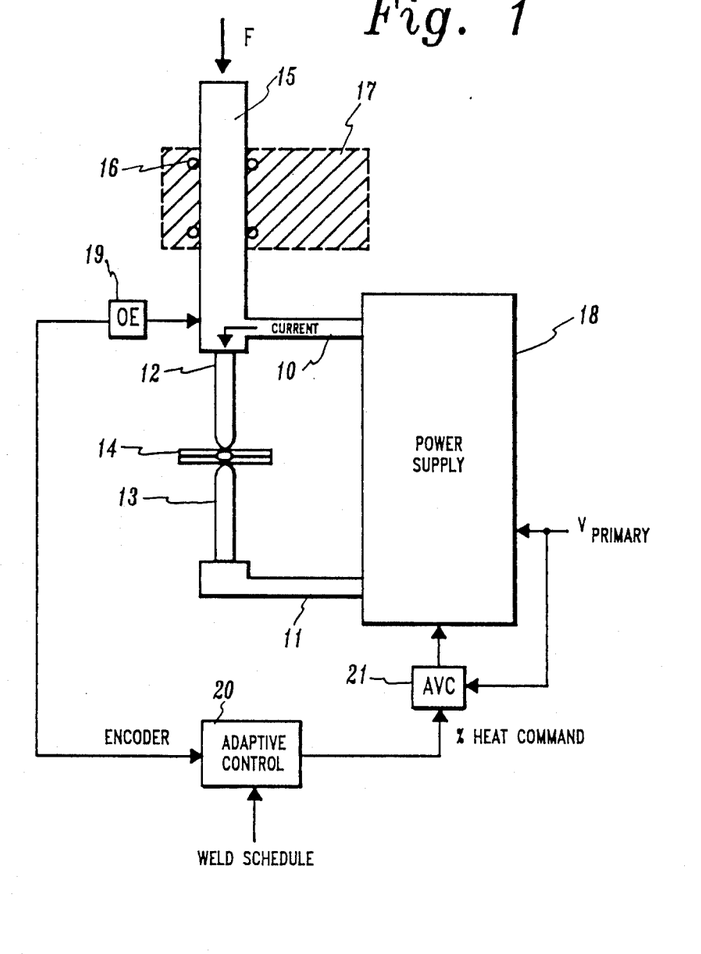
FIG. 1 shows schematically a pedestal spot welder and the adaptive controller.

Resistance spot welding has long been used as a method of joining sheet metal. It is known that in order to guarantee the quality of the spot weld as the electrodes wear and in the presence of part fit up anomalies and machine variation, a real time power control is required. The weld nugget is formed between metal workpiece sheets which are held together with a suitable welding force as shown in FIG. 1. After good contact has been established between the workpiece and the electrodes a large current is generated through the workpiece by a power supply. Heat is produced in the workpiece due to metal contact resistance and the current generated between the electrodes. The quality of the weld is influenced by the electrode condition, the metal to metal contact resistance, and the material surface condition. Each of these variables affects the heat produced at the workpiece by changing the effective resistance at the workpiece. As the effective resistance changes it is necessary to increase or decrease the current magnitude in order to maintain the power to the workpiece at a level which will melt the metal and produce a good weld. The machine calibration (heat command versus current) is also another source of heat error which has to be compensated. The resistance, in addition to changing from weld to weld, varies with time during the weld requiring that the power control be regulated in real time. In order to produce acceptable welds with the present machines it is necessary to measure weld quality periodically with test coupons and adjust the machine heat bias to insure that the constant heat applied produces acceptable welds. These tests are labor intensive and to not guarantee than good welds are produced all the time. The use of adaptive controls will not only ensure the quality of each weld but will also eliminate the requirement for test coupons thus increasing productivity and reducing costs.

Resistance spot welding has received considerable attention relative tocomputer control and instrumentation. In U.S. Pat. No. 4,596,917, "Resistance Spot Welder Process Monitor", sensors on the machine measure welding input variables and a simplified analytical model of the spot welding process is the reference for the weld quality logic required for monitoring the process. U.S. Pat. No. 4,447,700, "Resistance Spot Welder Adaptive Control", discloses monitoring the spot welding machine with a microcomputer which provides a real time data acquisition of the various welding parameters. The control uses thermal expansion and its first derivative to control the welding power and cooling rate as a means of controlling the quality of the nugget. In each of these prior inventions significant improvements were made in monitoring the quality of the weld. There is no specific definition of a real time adaptive control which regulates the heat input to the spot weld.

SUMMARY OF THE INVENTION

An object of the invention is to provide real time adaptive computer control for a resistance spot welding machine which will guarantee a good weld in the presence of welding anomalies such as variations in the electrode condition, machine condition, workpiece surface condition and other factors.

Another object is an adaptive control that will detect and measure spot welding process parameters, which can change from weld to weld as well as during the weld, and make suitable adjustments to the welding power control to produce a good weld.

The invention utilizes conventional measurements of workpiece displacement due to thermal growth; the welding machine heat command, which determines the welding current and $I^2R$ heat generated in the workpiece, is the control input but with significant improvement in the control algorithms that regulate the heat command. The adaptive spot welding control typically has three phases of operation which take place in order to apply the desired heat to the workpiece. Initially the process is observed for a short period at constant heat and measurements may be taken of the process to determine estimated process gain, i.e. displacement versus heat command input. During the trajectory phase the heat to the workpiece is regulated for a predetermined time period determined by workpiece characteristics. The final phase maintains the heat calculated by the second phase and terminates the weld when the desired displacement is attained.

One aspect of the invention is an improved real time adaptive control system for a resistance spot welding machine comprised of: a sensor on the machine to measure electrode or workpiece displacement; an estimator to monitor the process and calsulate an estimated real time process gain and bias for every displacement measurement; a compensator to generate a desired displacement versus time trajectory to yield acceptable welds under ideal machine and workiece conditions using constant heat; and a model reference feedback control whose output is the dynamic heat command to control the welding current and heat generated in the workpiece over a wide range of process variability. The offline model reference control has a mathematical model of the spot welding process; the input to the model is the heat command and it computes the normalized displacement which would be produced by the workpiece in response to that heat command. Means are provided to calculate estimated displacement from said process model normalized displacement and predicted process gain and bias; to compare the estimated and desired displacements and generate an error; and to compensate the error and sum the result with an initial heat setting to yield the welding machine heat command.

Other features of the adaptive controller are that the estimator may utilize a least square algorithm; that the means to compensate the displacement error may include a PID (proportional-integral-derivative) compensator; and that means such as a Smith-predictor may be in parallel with the compensator to account for an initial welding machine power supply time delay before obtaining any process response.

Another aspect of the invention is a method of controlling a spot welding process performed on a welding machine. Briefly stated, a model reference control is provided whose output is the dynamic heat command to yield acceptable spot welds in the presence of welding anomalies. The model reference control has a model of the spot welding process and calculates estimated displacement using an estimated real time process gain derived from the model and measurements of workpiece displacement. A desired displacement trajectory command is generated to achieve good welds at constant heat under ideal conditions. The concluding steps are comparing the estimated and desired displacements to produce an error, compensating the latter, and regulating the heat command with the compensated error.

The process model may include the time delay of the spot welder power supply, the dynamics of the current inductive time constant, the I squared effect of current when converting to power, and the thermal dynamic displacement time constant of the mass made up by the electrodes and workpiece. Another feature of the method is that measurements of displacement and the various calculations and determination of heat command are done at every power pulse (1/360 sec. intervals on a 3 phase, 60 Hz welder). After a given number of power pulses and at the end of the trajectory phase the heat command is maintained until a desired displacement is attained and the weld is terminated.

DETAILED DESCRIPTION OF THE INVENTION

The pedestal spot welding machine illustrated in FIG. 1 has upper and lower conductor arms 10 and 11 and electrodes 12 and 13 between which is held the workpiece 14. A typical electrode force of 1200 lbs. is produced by a load piston 15 which has bearings 16 and is supported in a frame 17. Low voltage, high amperage power pulses are generated by a power supply 18 and passed through the workpiece where heating is produced primarily by the Joule effect, and a weld nugget forms at the interface. Electrode displacement or workpiece displacement due to thermal growth is measured at every power pulse by an optical encoder 19 or other displacement sensor.

The inputs to the computerized adaptive control 20 of this invention are an adaptive weld schedule and the encoder displacement measurements; its output is the percent heat command which controls the welding current and heat generated in the workpiece. This is a three-phase welding machine with a SCR power supply. There are also single phase welding machines and older machines have ignitrons. Power supply 18 typically has a three phase-to-three phase transformer, the primary circuit of which has three pairs of inverse-parallel, phase controlled and naturally commutated, SCRs to control the current. The secondary circuit supplies current to low voltage rectifiers, which in turn deliver high amperage, low voltage pulses of power to the welding electrodes. The % heat command (0 to 200%) is a digital voltage command to the power supply 18 to adjust the firing angle of the SCRs and thus determine current. The primary voltage supplied to power supply 18 is presented to an automatic voltage control circuit 21 to compensate for variations in the line voltage. A given heat command therefore results in the same welding current.

Figure 2:
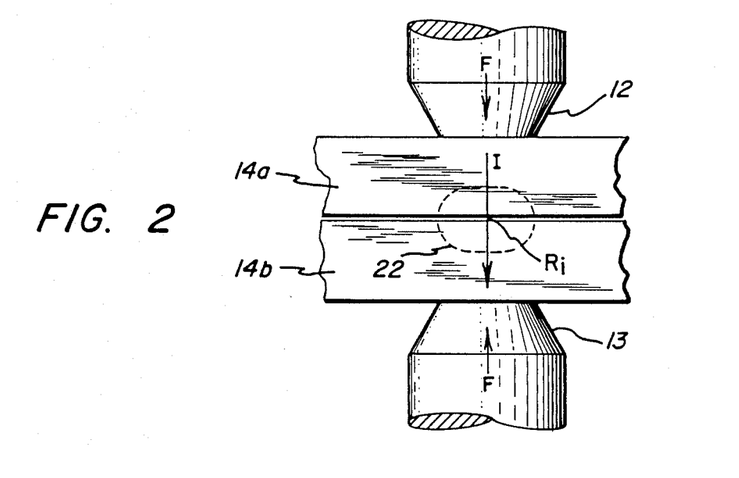
FIG. 2 is a side view of the welding electrodes applying force to metal workpiece sheets.

FIG. 2 is a side elevation of the electrodes 12 and 13 and the metal workpiece sheets 14a and 14b. A large welding current I, typically 5,000 amperes, passes thrugh the workpieces. Some localized heating may occur at the electrode and workpiece interface, but this is small compared to the interior heating in the workpieces. The resistance $R_i$ at the interface between the workpieces is large compared to other resistances in the circuit. The melting temperature is attained and produces an expanding molten metal zone emanating from the workpiece interface. This phase change from solid to liquid creates a large thermal expansion which must be contained by the electrode forces exerted. After the weld is terminated and the cool down process occurs a spot weld nugget 22 is formed joining the two workpieces together. The resistance at the interface changes during the course of the weld, decresing to as little as one quarter of the initial value. The spot welding process typically takes place in a time frame of 250 milliseconds and the control regulation in 100 milliseconds. As was stated, adaptive control is necessary to adjust the heat input to the process (heat is proportional to $I^2R$) to compensate for electrode wear, oxidized workpiece surfaces, fit up variations in the workpiece, and machine variation. The power output to the resistance spot weld must be maintained high enough to ensure the formation of an acceptable nugget and low enough to avoid an expulsion, i.e. release of molten metal from the nugget.

Figure 3:
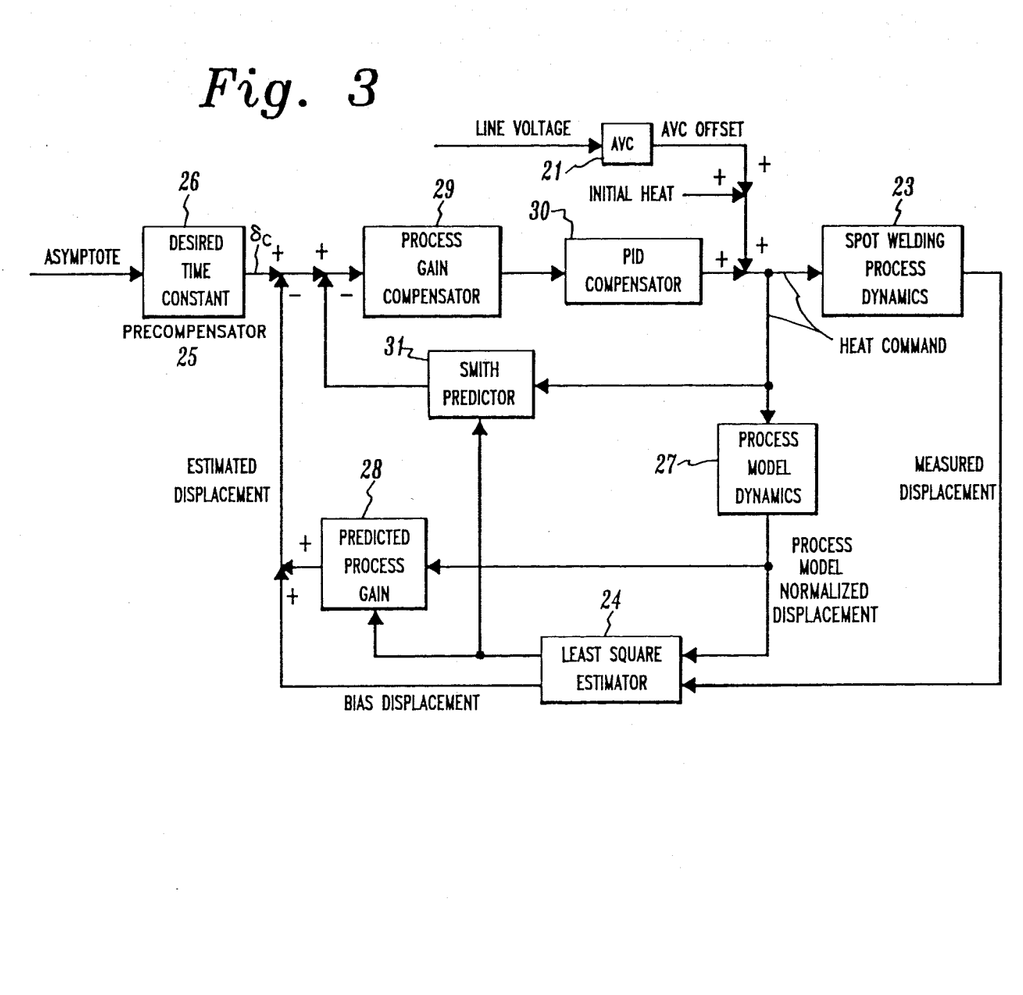
FIG. 3 is a block diagram of the spot welding adaptive control.
Figure 4:
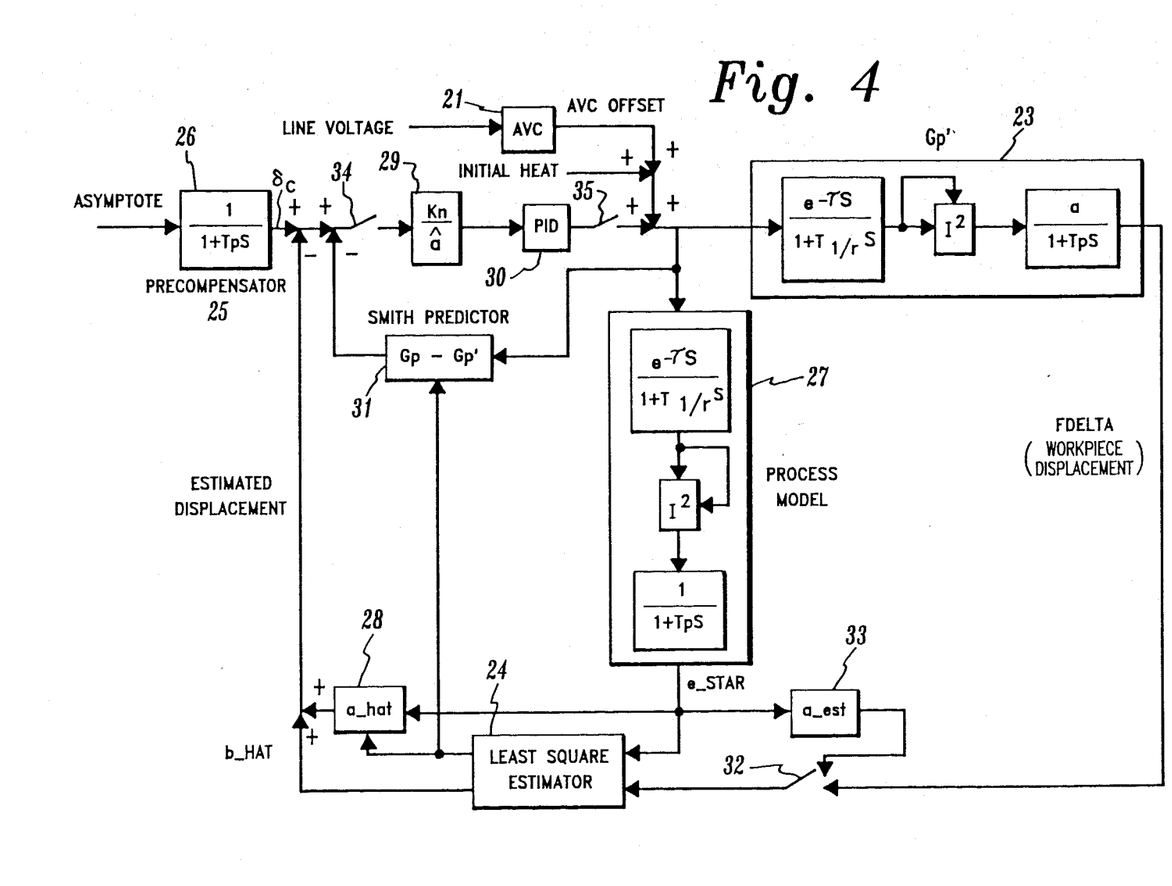
FIG. 4 is a control system diagram of the adaptive control.

The spot welding adaptive control (SWAC) shown in FIGS. 3 and 4 compensates for both the weld-to-weld variations as well as the real time process changes. FIG. 3 is a conventional block diagram of the control, which is implemented in software but could be provided as a hardware circuit. FIG. 4 shows the same in control system nomenclature and illustrates a few additional features; the symbols are identified in Appendix A. The real time adaptive spot welding control has three phases of operation which take place in order to apply the desired heat to the workpiece. During the initial phase the spot welding process is observed for a short period at constant heat, using the same heat command, for a typical period of 12 power pulses. Power supply 18 generates power pulses at 1/360 sec. intervals. Displacement measurements are made to determine the process gain, workpiece displacement versus heat input. The second phase is the trajectory phase. The heat to the workpiece is regulated for a time period determined by the workpiece characteristics. The heat command may be dynamically controlled, for instance, for a given number of power pulses such as 42 power pulses. Measurements of displacement due to thermal growth are compared to a shaped displacement target command and an error is generated which produces the heat command. The third and final phase maintains the heat calculated by the second phase and terminates the weld when the desired displacement is attained.

The real time spot welding adaptive control embodies several novel control techniques which are integrated together in a unique combination to provide a method of controlling the weld nugget size over a wide range of process variability. The preferred embodiments of the control have three basic components integrated together to form a real time adaptive control which adjusts to the process during the weld. These components are a least square estimator as an observer and process monitor; a precompensator for shaping a desired displacement target command; and a model reference control with a Smith-predictor to compensate for initial welding machine time delays, and a proportional, integral, derivative (PID) compensator. In FIGS. 3 and 4, the spot welding process and its dynamics are indicated at 23, the least square estimator at 24, the precompensator at 25 and 26, and the model reference feedback control at 27-31. The output of the model reference control is an error which is summed with an initial heat command and regulates the heat command which is the input to the spot welding machine. An AVC offset voltage generated by automatic voltage control 21 is summed with the initial heat command voltage to account for variations in the line voltage.

The SWAC control is a model reference control with a least square estimator for observing and monitoring the spot welding process. The inputs to least square estimator 24 are the actual measured displacement, fdelta, and the process model normalized displacement, e_star, input to the process. The process model 27 has a mathematical model of the spot welding process and, given the heat command as the input to the model, calculates the process model normalized displacement that would be produced by the workpiece in response to that heat input. The estimator calculates, from N samples of displacement and process model normalized displacement (one sample per power pulse), a predicted linear process gain 28 which is used in the model reference control loop. Estimator 24 calculates the predicted linear process gain, a_hat, and bias displacement, b_hat, using a conventional linear least square algorithm to fit the collected data. The encoder displacement and heat command data are collected once per power pulse (1/360 sec.) during the course of the weld. The estimator decreases the sensitivity of the feedback control to non-linearities such as load piston friction and encoder resolution.

Figure 5:
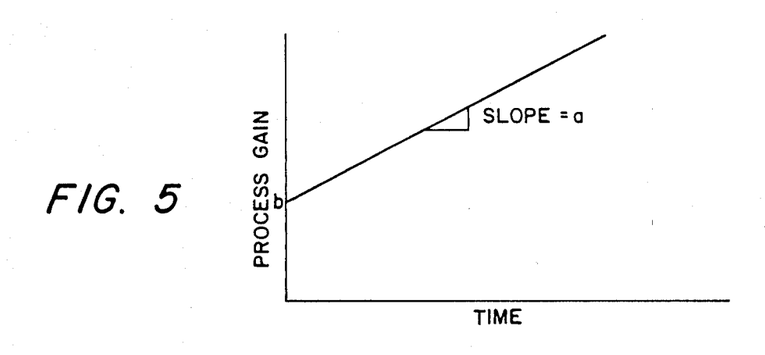
FIG. 5 is a curve illustrating the estimated linear process gain and bias calculated by the least square estimator.

As is seen in FIG. 5, where process gain versus time is shown, a_hat is the slope of the linear process gain curve and b or b_hat is the bias displacement offset term. This is a first order approximation of the process gain, displacement versus heat command input. The equations for calculating estimated linear process gain, a_hat, and bias displacement b_hat, are as follows.

These are utilized to calculate estimated displacement $\delta$, in the model reference control loop.

$$\delta = a\_hat * e\_star + b\_hat \quad (1)$$

$$a\_hat = \frac{N * \Sigma fdelta * \Sigma e\_star - \Sigma fdelta * \Sigma e\_star}{N * \Sigma e\_star^2 - \Sigma e\_star * \Sigma e\_star} \quad (2)$$

$$b\_hat = \frac{\{\Sigma fdelta - a\_hat * \Sigma e\_star\}}{N} \quad (3)$$

where N=number of samples, e_star = process model normalized displacement, fdelta = encoder displacement, and $\delta$= estimated displacement.

During the initial control phase, the estimator 24 is used to calculate the predicted process gain with a constant heat command prior to control regulation. The initial heat command value is determined from constant heat weld tests which produce good nuggets with new electrodes. There are some inherent delays in the system before a detectable displacement measurement is produced. It takes four power pulses due to computer delay to turn on an SCR in the power supply, and three power pulses before the displacement exceeds the encoder threshold. After seven power pulses or until detectable growth is seen, switch 32 in FIG. 4 closes and displacement measurements are then presented to estimator 24. Prior to that an estimated initial gain 33, a_est, is provided to the estimator. After the initial control phase, the heat command id allowed to vary as calculated by the model reference control loop. The estimator continues to calculate the linear gain of the process during the trajectory phase of the weld and provide a real time measure of the estimated predicted process gain. The real time gain calculation allows the model reference control to follow the actual process during the welding and produce a more accurate calculation of the heat command. The estimator can be implemented as recursive or as straight averaging. The method of calculation is determined by the expected dynamic variation in the gain versus time. For rapid and large variations in contact resistance, the recursive estimator is the appropriate calculation method. For most of the spot welding applications, the gain variation is relatively slow which permits sufficient accuracy to be obtained with the straight averaging least square estimator.

The model reference control, FIGS. 3 and 4, provides the dynamic heat control output to the spot welder power supply 18. The process model algorithms take the heat command as an input and calculate the expected or estimated workpiece displacement due to thermal growth using the predicted linear process gain, a_hat, and bias, b_hat, calculated by the estimator. The process model 27 includes the time delay of the power supply, the dynamics of the current inductive time constant, the I squared effect of the current when converting to power, and the dynamic time constant of the thermal mass made up by the electrodes and workpiece. In FIG. 4, $\tau$=power supply time delay (seconds), S=Laplacian Operator, $T_{l/r}$ =current inductive time constant (seconds), and $T_p$ =thermal lag time constant (seconds). The first two terms relate to the power supply and its time delay and inductive time constant. The third term concerns the current applied to the workpiece; heat is proportional to current squared. The fourth term relates to the exponential rise of displacement; the thermal time constant is the time it take displacement to reach 63% of maximum displacement at constant current. All of these parameters are known and can be determined experimentally. The output of process model 27 is the predicted process model normalized displacement, e_star, that would be produced by the workpiece in response to the given heat command input. The model refrence control now calculates estimated workpiece displacement as shown in equation (1) from the product of the predicted linear process gain, block 28, and process model normalized displacement to which is added the bias displacement. In control nomenclature, a_hat is multiplied by e_star and summed with the b_hat. The process model estimated displacement is compared to the shaped trajectory precompensator command and an error is generated which is used to regulate the heat command through compensators 29 and 30.

Figure 6:
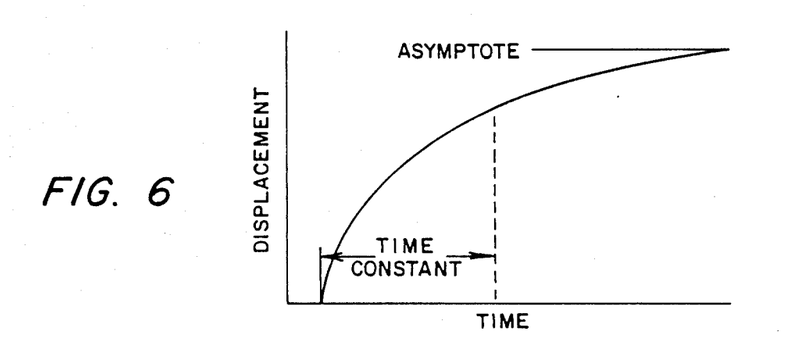
FIG. 6 shows an exponential displacement curve resulting from constant heat to the process.

Precompensator 25 generates a shaped displacement trajector command which is selected to approximate the desired displacement versus time resulting from a constant heat command to the process under idealized process conditions (new electrodes, smooth, clean workpiece surfaces, no fit up anomaly, etc). The precompensator parameters are determined by the workpiece geometry and the characteristics of the electrodes used to make the welds. The precompensator in its simplest form may be an integrator which produces a displacement trajectory which increases linearly with time. For thick materials where the thermal time constant is quite large, this simple type of precompensator may be entirely adequate for producing good welds. For thinner materials, the shaped or desired trajectory is more closely approximated by a linear exponential change in displacement versus time.

$$\delta_c = g\_\text{asymptote}\left(1 - e^{-\frac{t}{T_p}}\right) \quad (4)$$

where $\delta_c$ = computed displacement, $T_p$ represents the time constant of the exponential, and g_asymptote is the desired steady state displacement at infinite time assuming a constant heat command to the weld. Such an exponential displacement curve is shown in FIG. 6, where the asymptote to the cureve is the maximum displacement and the time constant is the time to reach 63% of maximum displacement. Given the asymptote and desired time constant 26, FIG. 3, the desired displacement versus time trajectory is easily constructed, power pulse by power pulse, by the computer. The time constant and asymptote for a specific spot weld are related to the thickness of the workpiece material, the size of the electrodes and heating rate of the welder. If they are selected to match the material and electrode characteristics, the resultant heat command during the regulation or trajectory phase will increase or decrease from the nominal in order to hold a displacement versus time relationship which will closely correspond to the displacement trajectory obtained with a constant heat and new electrodes. The calculated increase or decrease in heat command during the trajectory phase compensates for the deviation from the new electrode condition and ideal metal surface.

The desired displacement calculated by precompensator 25 is presented to the model reference control where it is compared to the estimated displacement calculated by the process model. A displacement error is generated and regulates the heat command through process gain compensator 29 and PID compensator 30.

Switches 34 and 35, FIG. 4, are activated with five power pulses of detectable displacement; these software switches before and after the compensators do not close until after twelve power pulses have been sent to the workpiece. The actual number of power pulses depends on the specific weld. Process gain compensator 29 is represented in control nomenclature as the nominal compensator gain, Kn, divided by the average process gain, a. This provides control loop gain compensation. PID compensator 30 filters the error using proportional, integral and derivative algorithms. The compensated error is summed with the initial heat command to yield the welding machine heat command supplied to power supply 18.

In addition to the PID control algorithm, the compensator includes a Smith-predictor 31 which is used to improve the control stability in the presence of power supply time delay. These are described in Computer Control Systems, Astrom and Wittenmark, Prentice-Hall, Inc., 1984. The Smith-predictor 31 is implemented by differencing the undelayed and delayed process model dynamics, Gp and Gp', as an inner feedback loop as described by the following equation:

$$\{G_p - G_p * e^{-\tau*s}\} \quad (5)$$

where $\tau$ = power supply time delay (seconds) and S = Laplacian Operator. This type of control feedback provides an anticipatory closed loop command to the process before any output response is generated. The Smith-predictor 31 is effective during the first four power pulses after switches 34 and 35 are activated and the first compensated error is generated. There is a time delay corresponding to four power pulses while the computer does the heat command calculation, it is read out, and sent to the power supply and to the SCR firing circuits. In the steady state and after the time delay $\tau$ has been exceeded the inner loop feedback becomes zero, the Smith-predictor 31 drops out, and the response of the system is determined by the outer loop. The delayed process parameter Gp' is calculated as shown in block 23, FIG. 4. The undelayed process parameter Gp includes all of Gp' except time delay $e^{-\tau S}$. The predicted process gain, a, is included in both of these and for this reason the estimated linear process gain, a_hat, is provided to the Smith-predictor.

To conclude the discussion of the model reference control, the dynamic closed loop control response which produces the heat command to the weld occurs entirely in the computer model reference control algorithm and is modified by the actual process through the estimator or observer 24. There is no direct feedback of the displacement sensor.

The discrete time implementation of the real time adaptive spot welding control algorithms are calculated using conventional recursive Euler integration techniques. A listing of the source code written in C programming language which was used to implement the discrete time control algorithms and the least square estimator is included in Appendix B.

Figure 7:
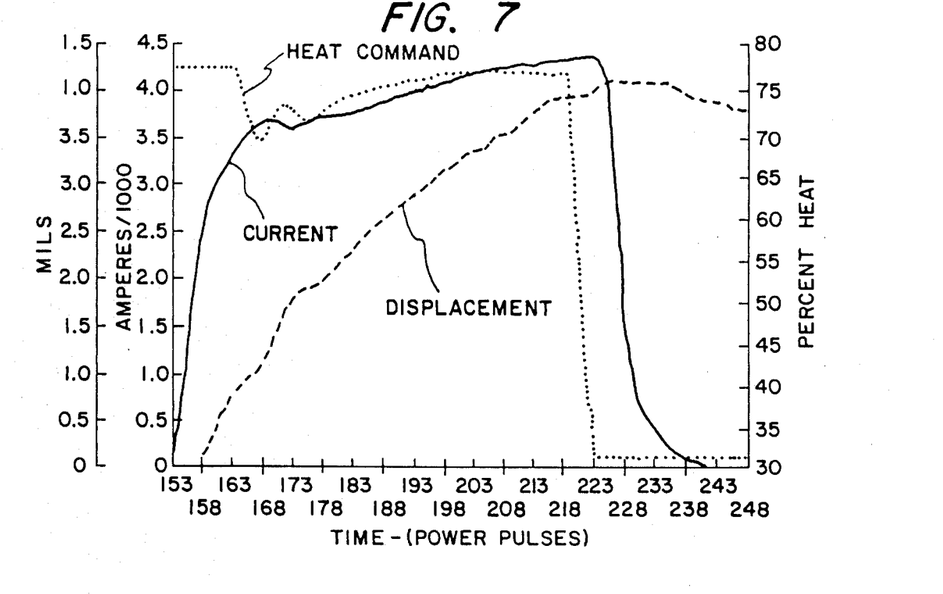
FIG. 7 shows test data of current, displacement and heat command and the adaptive control response with new electrodes and good fit.
Figure 8:
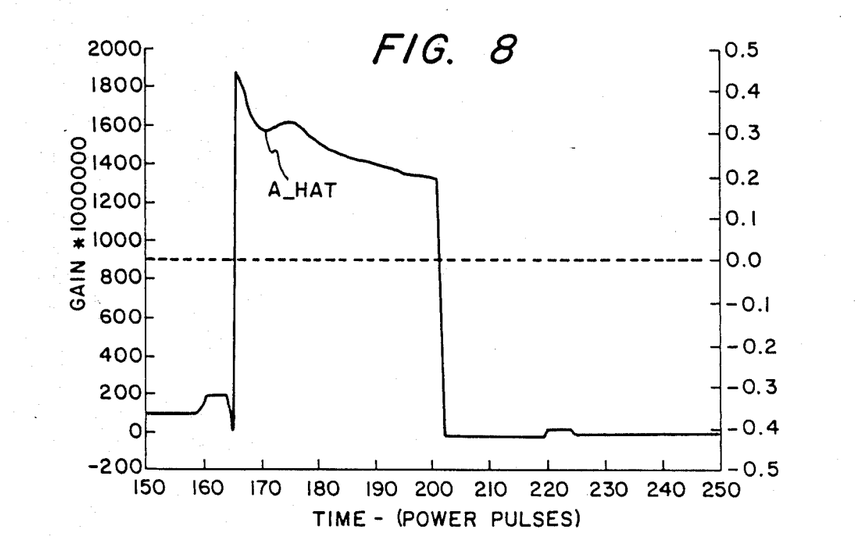
FIG. 8 shows the estimated linear process gain, a_hat, for the data in FIG. 7.

FIGS. 7-10 present test data showing the dynamic performance of the spot welder operation with the adaptive control. FIG. 7 represents the response performance with new electrodes and standard metal test coupons with sheet metal thickness of 0.020/0.025 inches. The data presented show the current, displacement and heat command response. The heat is held constant for a period of approximately twelve power pulses prior to activating the control action during the trajectory phase. The constant heat allows the adaptive control estimator 24 to identify the projected process gain and calculate the desired heat command to follow the target trajectory displacement curve. The initial heat command for new electrodes is in the direction to reduce the heat. The a_hat output of estimator 24, FIG. 8, initially calculates a gain which is high and then decreases as the weld progresses. The a_hat process gain follows the expected change in contact resistance which starts out as a large value and decreases by a factor of 2 to 1 over the course of the weld. The initial heat regulation occurs in four power pulses which is fast enough to avoid possible expulsion if the initial heat is too high. The heat command is increased during the remainder of the weld to adjust for the decrease in contact resistance which normally occurs for new electrodes and good fit.

Figure 9:
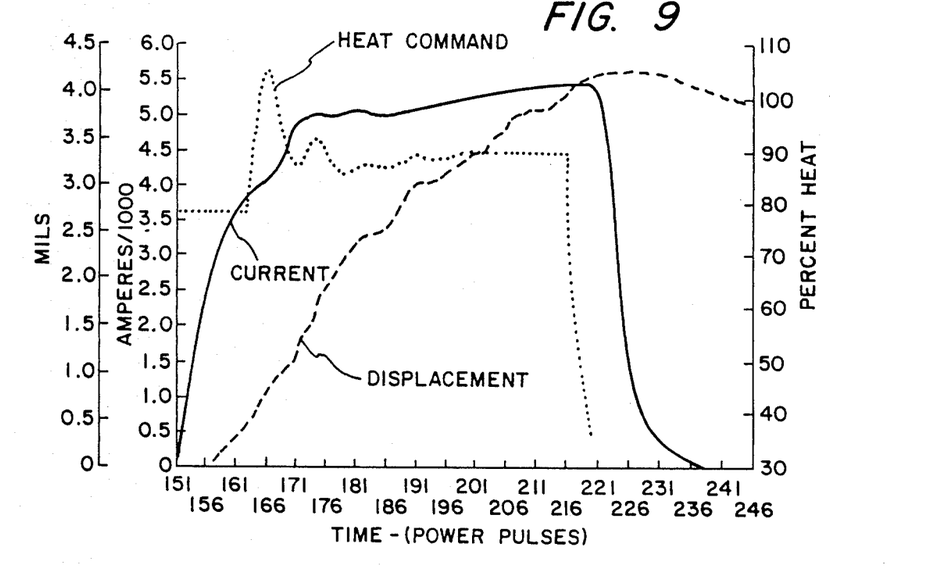
FIG. 9 shows test data and the adaptive control response with new electrodes and a fit up anomaly.
Figure 10:
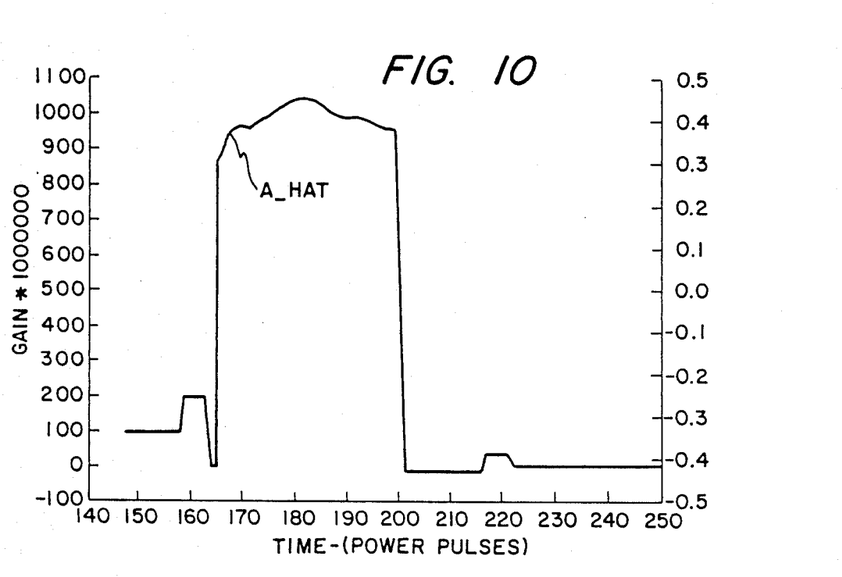
FIG. 10 shows the change in estimated linear process gain, a_hat, due to the anomaly.

The data presented in FIG. 9 represents the control response with a metal coupon which has a fit up anomaly such that there is not a positive contact between the two metal sheets. These data serve to illustrate that the physical metal contact has a dramatic effect on the heat command necessary to produce a good weld nugget. In this case the contact resistance was significantly reduced requiring a large increase in the power to produce a good weld nugget. The requirement for adaptive control is further amplified by the a_hat estimator response, FIG. 10, which starts out at one half the value of the previous run and increases as the weld progresses. If the heat had not been increased in the second run the result would have been a weld nugget with unacceptable penetration and diameter.

To conclude, significant improvements are made in part productivity and spot weld quality by instrumenting and automating the spot welding machines with the real time adaptive control of this invention. Results to date indicate that the spot welding adaptive control adjusts for long term electrode wear, provides short term weld to weld control action to compensate for fit up and surface oxide variations, and adjusts for other machine and process variations.

While the invention has been particularly shown and described with reference to a preferred embodiment, it will be understood by those skilled in the art that various changes in form and details may be made within the spirit and scope of the invention as defined in the appended claims.

APPENDIX A

Control Nomenclature $T_p$ = Thermal lag time constant (seconds)

$T_{l/r}$ = Current inductive time constant (seconds)

$N$ = number of samples $S$ = Laplacian Operator $t$ = time (seconds)

a_hat = a = estimated gain b_hat = estimated bias displacement e_star = process model normalized displacement $\delta$ = estimated thermal displacement (1/1000 inch)

fdelta = Encoder thermal displacement ( 1/1000 inch)

AVC = Automatic Voltage Control

Power Pulse = $\frac{1}{360}$ (seconds)

$\tau$ = power supply time delay (seconds)

Kn = nominal compensator gain a_est = initial gain estimate g_asymptote = asymptote = steady state displacement (mils .001 inches)

APPENDIX B
Software Control Algorithms

Copyright 1988 General Electric Co.

```c
#include <std.h>
#include <screen.h>
#include <swaclib.h>

/* This defines the number of entries to be maintained for the look-back. */
define BACK_COUNT        75 define DATA_DELAY        5
define NOMINAL_GAIN      .0007
#define A_HAT_R_FACTOR    4.0

/* Force read_displacement() to use local offset. DEPENDENT UPON DEFINITION
     OF read_displacement()..... BE CAREFUL IF IT CHANGES!!! */
define disp_offset base_displacement extern int      s_time_delay;
extern int      resolution_of_encoder;
int             last_disp=0;
int             base_displacement=0;

/* This defines the threshold for "significant growth" in encoder counts. */
#define GROWTH_THRESHOLD      2

/* This macro provide initialization of all locals except those specifically
     initialized to weld-dependant/time-dependant values. */
#define INIT_LOCALS      { for(eye=0; eye≤s_time_delay+2; eye++)
                                    ref_power_sq[eye] = 0.0;
                          ref_power = 0.0;
                          k_pid = k_i + k_p + k_d;
                          k_pd  = k_p + 2.0 * k_d;
                          l0_err = l1_err = l2_err = 0.0;
                          s_delta = s_cnt = s_sqcnt = 0.0;
                          fdelta = b_hat = s_dc = 0.0;
                          a_hat = g_asymptote/(start_heat*start_heat);
                          *error_code = 0;
                          a_hat *= A_HAT_R_FACTOR;
                          num_smpls = delta = last_disp = 0; }

/* This initializes the rings */
#define INIT_RINGS       { p_ptr = powers+2;
                           t_ptr = targets+2;
                           e_ptr = e_stars+2;
                           u_ptr = us+2;
                           u_d_ptr = u_delays+2;
                           ref_ptr_sq = ref_power_sq + s_time_delay-1;
                           for(eye=0; eye<BACK_COUNT; eye++) {
                                 targets[eye] = 0.0;
                                 e_stars[eye] = 0.0;
                                 powers[eye]  = start_heat;
                                 us[eye] = 0.0;
                                 u_delays[eye] = 0.0; } }

/* This macro updates the various sums */
#define UPDATE_SUMS      { s_delta += fdelta;
                           s_cnt   += (temp_estar = *e_ptr);
                           s_sqcnt += temp_estar * temp_estar;
                           s_dc    += fdelta * temp_estar;
                           num_smpls++; }
```

```
/* This macro tests for (and breaks after) a command-line-set number of
   consecutive expulsions   */
#define EXP_CHK           { if( last_disp-delta >= exp_thresh )                    \
                                { if( ++cons_exp_cnt >= exp_trip ) {              \
                                    cons_exp_cnt = 0;                             \
                                    *error_code |=                                \
                                            (EXPULSION_OCCURRED | ABORT); }\
                                    return( NO ); } }
/* This macro test for the error condition of not meeting the growth "wall"
   TRUE behavior redefined 4/24/87 to cause immediate successful return
   with the original heat used during <maintain>   */
#define WALL_CHK          { if( cyc_to_disp-- == 0 && delta < min_target ) {\
                                    set_phase( start_heat + avc_delta );          \
                                    return( YES ); } }

/* This macro checks for heat OFF (an error condition is flagged) */
#define HEAT_CHK          { if( !read_heat_enable() ) {                           \
                                    *error_code |= (WELD_FAIL | ABORT);           \
                                    return( NO ); } }

/* This macro provides a fail-safe for the initial "wait for growth" loop */
#define FAIL_SAFE         { if( !(fail_safe_cnt--) ) {                            \
                                    *error_code |= (WELD_FAIL | ABORT);           \
                                    return( NO ); } }

/* This macro checks the growth during the weld against the threshold for a
   good weld.  Execution is terminated (successfully if over threshold) */
#define CUTOFF_CHK        { if( fdelta >= g_cutoff ) return( YES ); }

/* This macro checks the number of arguments, recall that the present
   version of "traject" requires between 14 and 16 arguments to the "adapt1"
   command..                                                                   */
#define ARG_CHK           { if( n_args < 14 || n_args > 16 ) {                    \
                                    *error_code |= (WELD_FAIL | ABORT);           \
                                    errfmt("<trajectory> wrong # args...\n");\
                                    return( NO ); } }

/* K. Overton version of the Haefner controller.
        Creation date: Jan-15-87
        Last revision: April-24-87          (changed "wall Test" behavior,
                                             added consecutive exp. test)     */
int
trajectory(n_args, max_cycles, traj_cycles, g_asymptote, g_cutoff,
                process_tc, lr_tc, cyc_to_disp, min_target, exp_thresh, k_p,
                k_i, k_d, exp_trip, req_heat, error_code)
        int         n_args, max_cycles, traj_cycles, cyc_to_disp, exp_thresh;
        int         min_target, exp_trip;
        long        *error_code;
        float       g_asymptote, g_cutoff, process_tc, lr_tc, req_heat;
        float       k_p, k_i, k_d;
{
        register float   *ref_ptr_sq, *p_ptr, *t_ptr, *e_ptr, *u_ptr, *u_d_ptr;
        static int       eye, start_traj_pulse, cycle, cons_exp_cnt=0;
        static int       delta, fail_safe_cnt, num_smpls, cnt;
        static float     temp_estar, ref_power, gain_factor, avc_delta;
        static float     start_heat, k_pid, k_pd, tp1, tp2, tlr1, tlr2;
        static float     l0_err, l1_err, l2_err;
        static float     l0_pid_err, l1_pid_err, l2_pid_err;
        static float     s_cnt, s_delta, s_sqcnt;
        static float     b_hat, tp2_x_growth;
        static float     a_hat, fdelta, s_dc;
        static float     powers[BACK_COUNT], ref_power_sq[BACK_COUNT];
        static float     targets[BACK_COUNT], e_stars[BACK_COUNT];
        static float     us[BACK_COUNT], u_delays[BACK_COUNT];

/* * * * * * * * * *
/* INITIALIZATION  *
/* * * * * * * * * *
/*** check that either 14, 15, or 16 arguments were passed to the
        "adapt1" command */
        ARG_CHK
```

```
/*** calculate the coefficients relating to the process and L/R time
     constants (units of time constants is "pulses") */
        tp1  = process_tc / (1.0 + process_tc);
        tp2  = 1.0 - tp1;
        tlr1 = lr_tc / (1.0 + lr_tc);
        tlr2 = 1.0 - tlr1;

/*** calculate some intermediate quantities to speed execution */
        tp2_x_growth = tp2 * g_asymptote;

/**** clear the history field */
        set_aux2( 0 );

/*** get the current heat (and save it for use iff MONOTONIC set */
        avc_delta = read_phase_percent() - (start_heat = req_heat);

/*** set the fail safe time-out count to a large number of cycles (pulses) */
        fail_safe_cnt = 50 * PPPCYCLE;

/*** initialize the local static variables */
        INIT_LOCALS

/*** initialize the rings */
        INIT_RINGS

/*** convert the growth "wall" delay and trajectory length to pulses */
        cyc_to_disp *= PPPCYCLE;
        traj_cycles *= PPPCYCLE;

/*** set the displacement offset */
        set_zero_displacement();

/*** wait for the beginning of the next pulse */
        cycle = read_count();
        while( cycle == read_count() );

/*** zero the displacement offset */
        set_zero_displacement();

/*** turn the power on */
        set_heat_enable( max_cycles * PPPCYCLE );

/* * * * * * * * * * * * * * * */
/*   WAIT FOR GROWTH TO BEGIN  */
/* * * * * * * * * * * * * * * */
        while( (delta=read_displacement()) < GROWTH_THRESHOLD )
        {

/* - clear the aux2 field as an aid in verifying computation */
                set_aux2( 0 );

/* - get the present cycle number */
                cycle = read_count();

/* - check for no heat */
                HEAT_CHK

/* - check for "time-out" waiting for significant growth */
                FAIL_SAFE /* - update the ring pointers */
                ref_ptr_sq++; p_ptr++; t_ptr++; e_ptr++; u_ptr++; u_d_ptr++;

/* - update the target displacement */
                *t_ptr = tp1 * (*(t_ptr-1)) + tp2_x_growth;

/* - update e_star (and the sums) offset in time by "s_time_delay" */
                *e_ptr = tp1* (*(e_ptr-1)) + tp2 * (*(ref_ptr_sq-s_time_delay));
```

```
/* - - new update of estimated fdelta */
                fdelta = a_hat * (temp_estar = *e_ptr);
                UPDATE_SUMS /* - update the reference power and (un)delayed powers */
                *u_ptr = tp1 * (*(u_ptr-1)) + tp2 * (*(ref_ptr_sq-1));
                *u_d_ptr = tp1 * (*(u_d_ptr-1)) +
                                        tp2 * (*(ref_ptr_sq-s_time_delay));
                ref_power = tlr1 * ref_power + tlr2 * start_heat;
                *ref_ptr_sq = ref_power * ref_power;

/* - mark the present pulse as being in the "wait for growth" loop */
                set_aux2( 100 );

/* - wait for the next pulse to begin */
                while( cycle == (start_traj_pulse=read_count()) ) ;
                }

/* save the last delta for the expulsion check */
        last_disp = delta;

/* * * * * * * * * * * * * * * * */
/*   DELAY FOR OUTPUT RESPONSE   */
/* * * * * * * * * * * * * * * * */
        while( (cycle=read_count()) < start_traj_pulse+DATA_DELAY )
              {

/* - clear the aux2 field as an aid in verifying computation */
                set_aux2( 0 );

/* - check for no heat */
                HEAT_CHK

/* - get the present displacement delta */
                fdelta = ((float)(delta=read_displacement())) /
                                                (float)resolution_of_encoder;

/* - check for expulsion */
                EXP_CHK

/* - save this delta as the last delta for the next expulsion check */
                last_disp = delta;

/* - check for the minimum growth "wall" */
                WALL_CHK

/* - save this delta as the last delta for the next expulsion check */
                last_disp = delta;

/* - update the ring pointers */
                ref_ptr_sq++; p_ptr++; t_ptr++; e_ptr++; u_ptr++; u_d_ptr++;

/* - update the target displacement */
                *t_ptr = tp1 * (*(t_ptr-1)) + tp2_x_growth;

/* - update the power applied to the weld */
                *e_ptr = tp1* (*(e_ptr-1)) + tp2 * (*(ref_ptr_sq-s_time_delay));

/* - update the history sums */
                UPDATE_SUMS

/* - update the reference power and (un)delayed powers */
                *u_ptr = tp1 * (*(u_ptr-1)) + tp2 * (*(ref_ptr_sq-1));
                *u_d_ptr = tp1 * (*(u_d_ptr-1)) +
                                        tp2 * (*(ref_ptr_sq-s_time_delay));
                ref_power = tlr1 * ref_power + tlr2 * start_heat;
                *ref_ptr_sq = ref_power * ref_power;

/* - mark the present pulse as being in the "delay wait" loop */
                set_aux2( 200 );
```

```
/* - wait for the next pulse */
                    while( cycle = read_count() ) ;
            }

/* * * * * * * * * * * * * */
/*  ADAPTIVE  CONTROL  LOOP  */
/* * * * * * * * * * * * * */
/* + loop - while pulses at the present expected growth rate remain */
            for(cnt=0; cnt<traj_cycles-DATA_DELAY; cnt++)
            {

/* + clear the aux2 field as an aid in verifying computation */
                    set_aux2( 0 );

/* + check for no heat */
                    HEAT_CHK

/* + get the present displacement delta */
                    delta = read_displacement();

/* + check for expulsion */
                    EXP_CHK

/* + save this delta as the last delta for the next expulsion check */
                    last_disp = delta;

/* + check for the minimum growth "wall" */
                    WALL_CHK

/* + update the ring pointers */
                    ref_ptr_sq++; p_ptr++; t_ptr++; e_ptr++;

/* + get the displacement/update the target displacement */
                    *t_ptr = tp1 * (*(t_ptr-1)) + tp2_x_growth;
                    fdelta = (float)delta / (float)resolution_of_encoder;

/* + check for meeting the "good weld" growth threshold */
                    CUTOFF_CHK /* + update the total power applied to the weld */
                    *e_ptr = tp1* (*(e_ptr-1)) + tp2 * (*(ref_ptr_sq-s_time_delay));

/* + update the sum of previous powers */
                    UPDATE_SUMS

/* + calculate the new values of a-hat and b-hat */
                    a_hat = ((num_smpls*s_dc)-(s_delta*s_cnt)) /
                            ((num_smpls*s_sqcnt)-(s_cnt*s_cnt));
                    b_hat = (s_delta - a_hat * s_cnt) / num_smpls;

/* + calculate the gain factor to accomodate for the variable process gain */
                    gain_factor = NOMINAL_GAIN / a_hat;

/* + calculate the displacement errors */
                    l0_err = *t_ptr   - (a_hat * (*e_ptr)   + b_hat);
                    l1_err = *(t_ptr-1) - (a_hat * (*(e_ptr-1)) + b_hat);
                    l2_err = *(t_ptr-2) - (a_hat * (*(e_ptr-2)) + b_hat);

/* + calculate the PID errors */
                    l0_pid_err = (l0_err + a_hat*( *u_d_ptr -
                                                    *u_ptr)) * gain_factor;
                    l1_pid_err = (l1_err + a_hat*( *(u_d_ptr-1) -
                                                    *(u_ptr-1) )) * gain_factor;
                    l2_pid_err = (l2_err + a_hat*( *(u_d_ptr-2) -
                                                    *(u_ptr-2) )) * gain_factor;

/* + calculate the new power */
                    *p_ptr = *(p_ptr-1) + k_pid*l0_pid_err -
                                            k_pd*l1_pid_err + k_d*l2_pid_err;
```

```
/* + send the power out to the hardware */
            set_phase( (*p_ptr) + avc_delta );

/* + update the reference power and (un)delayed powers */
            u_ptr++; u_d_ptr++;
            *u_ptr   = tp1 * (*(u_ptr-1))   + tp2 * (*(ref_ptr_sq-1));
            *u_d_ptr = tp1 * (*(u_d_ptr-1)) +
                                         tp2 * (*(ref_ptr_sq-s_time_delay));
            ref_power = tlr1 * ref_power + tlr2 * (*p_ptr);
            *ref_ptr_sq = ref_power * ref_power;

/* + save the value of a-hat in the history file */
            set_aux2( (short int)(a_hat*1000000.0) );

/* + wait for the end of the present cycle */
            while( cycle == read_count() );
            cycle = read_count();
        }

/* return path */
        set_aux2( 0 );
        return( YES );
    }   /* end of routine "traject" */
```

Copyright 1988 General Electric Co.

The invention claimed is:

1. A method of controlling in real time a resistance spot welding process performed on a welding machine, comprising:
providing a model reference control whose output is a dynamic welding machine heat command to control welding current and heat generated in a workpiece and yield acceptable spot welds over a range of process variability, said model reference control having a model of the spot welding process to which said heat command is input;
calculating estimated displacement using a real time process gain determined from an output of said model and measurements of workpiece displacement;
generating a desired displacement trajectory command to achieve good welds under ideal conditions using constant heat; and
comparing said estimated and desired displacements to yield an error, compensating the latter, and regulating said welding machine heat command with the compensated error.

2. The method of claim 1 wherein said welding machine is comprised of a power supply having inductive components that delivers power pulses to electrodes between which said workpiece is held, and said process model includes the time delay of the power supply, dynamics of a current inductive time constant, the effect of squaring current when converting current to power, and a dynamic time constant of a thermal mass made up of said electrodes and workpiece.

3. The method of claim 1 wherein said process model computes process model normalized displacement which would be produced by said workpiece in response to said welding machine heat command.

4. The method of claim 3 wherein said calculating estimated displacement comprises deriving the product of said estimated process gain and process model normalized displacement and summing with a bias displacement, where the latter and said process gain are computed by a least square algorithm from said process model normalized displacement and workpiece displacement measurements.

5. The method of claim 1 wherein said compensating comprises filtering the error with proportional, integral and derivative algorithms.

6. The method of claim 5 wherein said compensating further comprises compensating for an initial welding machine time delay before obtaining any process feedback.

7. A method of adaptively controlling a resistance spot welding process performed on a machine having an adjustable heat command to control the welding current and heat generated in a workpiece comprising:
providing an off-line model of the spot welding process and calculating, given said heat command as an input, process model normalized displacement;
measuring workpiece displacement due to thermal growth;
monitoring the process and calculating, from N samples of workpiece displacement and process model normalized displacement, an estimated linear process gain, defined as the relation between displacement and heat command input, and a bias displacement;
determining estimated displacement from the product of the estimated process gain and process model normalized displacement to which is added the bias displacement;
generating a shaped displacement trajectory command which gives a desired displacement versus time to yield acceptable spot welds under ideal process conditions using a constant heat; and
comparing said estimated and desired displacements and generating an error, compensating the latter, and regulating said heat command with the compensated error to achieve acceptable spot welds over a range of process variability.

8. The method of claim 7 wherein said machine is comprised of a power supply having inductive components that delivers pulses of power to electrodes between which said workpiece is held, and said process model includes the time delay of the power supply, dynamics of a current inductive time constant, the effect of squaring current when converting current to power, and a dynamic time constant of a thermal mass made up of said electrodes and workpiece.

9. The method of claim 8 wherein said measuring of workpiece displacement and calculating of process model normalized displacement and estimated displacement are performed once each power pulse.

10. The method of claim 7 wherein said calculating estimated linear process gain and bias displacement uses least square algorithms.

11. The method of claim 7 wherein said compensating comprises filtering the displacement error using proportional, integral and derivative algorithms.

12. The method of claim 11 wherein said compensating includes providing an inner Smith-predictor feedback loop and compensating for an initial welding machine time delay before obtaining any process response.

13. The method of claim 7 further comprising initially supplying a constant heat command to said machine and during an initial phase calculating said linear process gain and bias displacement.

14. The method of claim 13 further comprising maintaining the heat command computed after a predetermined time period during a final phase until a desired displacement is attained.

15. An adaptive control system for a resistance spot welding machine comprising:
 a model reference feedback control whose output is a dynamic welding machine heat command to control welding current and heat generated in a workpiece over a range of process variability;
 a sensor on said machine to measure workpiece displacement due to thermal growth;
 an estimator to monitor the process and calculate an estimated real time process gain for every displacement measurement;
 a precompensator that generates a desired displacement trajectory command to produce acceptable spot welds under ideal conditions using constant heat;
 said model reference control having a mathematical model of the spot welding process which computes process model normalized displacement resulting from said heat command, means to calculate estimated displacement from said process model normalized displacement and estimated process gain, means to compare said desired and estimated displacements and generate an error, and means to compensate said error and sum the result with an initial heat setting to yield said welding machine heat command.

16. The adaptive control system of claim 15 wherein said estimator calculates, from said process model normalized displacement and workpiece displacement, said estimated process gain and a bias displacement, and said means to calculate estimated displacement sums said bias displacement and the product of said estimated process gain and process model normalized displacement.

17. The adaptive control system of claim 16 wherein said estimator uses a least square algorithm.

18. The adaptive control system of claim 15 wherein said means to compensate said error is comprised of a process gain compensator and a proportional, integral and derivative compensator.

19. The adaptive control system of claim 18 further comprising means in prallel with said compensators to compensate for an initial welding machine power supply time delay before obtaining any process response.

20. The adaptive control system of claim 19 wherein said last-mentioned means is a Smith-predictor.

* * * * *